(12) United States Patent
Sun

(10) Patent No.: US 7,139,033 B2
(45) Date of Patent: Nov. 21, 2006

(54) SYSTEM AND METHOD FOR TELEVISION FRAME CAPTURE AND DISPLAY

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 542 days.

(21) Appl. No.: 10/369,376

(22) Filed: Feb. 19, 2003

(65) Prior Publication Data

US 2004/0160532 A1  Aug. 19, 2004

(51) Int. Cl.
 H04N 5/44 (2006.01)
(52) U.S. Cl. ..................... 348/559; 348/722
(58) Field of Classification Search ............... 348/559, 348/560, 333.05, 328, 564, 552, 553, 563, 348/554, 722; 715/838, 835
See application file for complete search history.

(56) References Cited

U.S. PATENT DOCUMENTS

| 4,855,813 | A |   | 8/1989  | Russel et al. ........... 358/22  |
| 5,121,476 | A | * | 6/1992  | Yee .......................... 348/559 |
| 5,150,200 | A |   | 9/1992  | Hong ......................... 358/22 |
| 5,329,320 | A | * | 7/1994  | Yifrach ..................... 348/738 |
| 5,978,546 | A | * | 11/1999 | Abe et al. ................. 386/124 |
| 6,040,873 | A | * | 3/2000  | Izumi et al. .............. 348/559 |
| 6,215,523 | B1 | * | 4/2001  | Anderson ............. 348/333.05 |
| 6,253,238 | B1 | * | 6/2001  | Lauder et al. ............ 709/217 |
| 6,297,851 | B1 |   | 10/2001 | Taubman et al. ......... 348/572 |
| 6,870,573 | B1 | * | 3/2005  | Yeo et al. ................. 348/569 |

* cited by examiner

Primary Examiner—Michael H. Lee
(74) Attorney, Agent, or Firm—Law Office of Gerald Maliszewski; Gerald Maliszewski

(57) ABSTRACT

A system and method are provided for frame capture and redisplay in a stand-alone television. The method comprises: down-converting a television signal including a plurality of frames; selecting an accepted frame; capturing the selected frame; storing the captured frame; selecting a stored frame; and, displaying the selected frame. Some aspects of the method further comprise: storing auxiliary information with the stored frame, such as time, date, or channel. Then, displaying the frame includes displaying the frame with the auxiliary information. Other aspects of the method further comprise: accepting a remote capture and remote display signals from a television remote control. Down-converted frames are selected for storage, and stored frames are selected for display in response to the remote signals. In other aspects, stored frames are displayed as thumbnail displays. For example, a single thumbnail display, or a group of thumbnail displays can be presented overlying the down-converted television signal.

38 Claims, 3 Drawing Sheets

SYSTEM AND METHOD FOR TELEVISION FRAME CAPTURE AND DISPLAY

BACKGROUND OF THE INVENTION

1. Field of the Invention

This invention generally relates to entertainment electronics and, more particularly, to a system and method for a stand-alone television to capture selected frames, store the frames, and present selected frames from storage.

2. Description of the Related Art

Television has proven to be one of the best means of broadcasting information and entertainment to every cross-section of the public. People watch news, sports, movies, shows, and advertisements on TV. They also play video games, participate in karaoke, listen to music or concerts, and even browse the Internet through their TV sets. The variety of content that can be displayed is practically unlimited.

However, almost everyone who has a TV set has encountered the following problem. Conventional TV sets have no memory of the picture content displayed on the screen. Therefore, it is not unusual for viewers to miss some important or desirable information that was briefly flashed on the screen, or shown when the viewer was not paying full attention. For example, it is very easy to miss the phone number or store locations shown in a TV advertisement, as a viewer is unlikely to memorize or write down every detail. Neither is it easy to memorize the statistics of a football team. Likewise, it is also not possible to copy down the stock performance plot of a hot company shown on CNBC, or memorize the 10-day weather forecast when the viewer is planning a camping plan.

If the screen is used as a video game monitor, it would be desirable for some children, who achieved a super score in a video game for example, to show the final screen or score to friends at a later date. It might also be desirable for parents to display a kid's school lunch menu on TV screen when they need it.

Computer-based video capture and processing techniques have been developed for use in conjunction with television sets. However, many viewers prefer not to clutter their entertainment center with computer equipment. Besides, many viewers find the computer boot-up and the operation of applications cumbersome. Recording media, such as a VCR can be connected to the TV to record content. However, this recording equipment is not really designed to clearly display a single frame. It can be cumbersome to find the desired frame, and the frame cannot always be clearly seen. Some stand-alone televisions have been developed systems that incorporate a still-frame function, however, this function itself does not support multiple frame storage and redisplay.

FIG. 1 is a schematic block diagram of a television (TV) receiving system (prior art). A viewer can use the remote control, through an infrared (IR) transmitter/receiver or radio frequency (RF) transmitter/receiver (not shown) to send control commands to the central processing unit (CPU) System. The CPU controls the TV receiver and the display unit accordingly. The display unit delivers the picture (and audio) to the viewer.

It would be advantageous if a stand-alone television could store a plurality of selected frames in a memory.

It would be advantageous if the frames stored by above-mentioned television could be displayed.

It would be advantageous if the capture, store, retrieve, and display frame operations could be preformed using simple and intuitive commands from a television remote control.

SUMMARY OF THE INVENTION

The present invention is an improved, stand-alone TV system that enables the capture and redisplay of TV frames, simultaneous with the viewing of a TV program. The system uses an embedded Frame Capture and Management Unit, referred to herein as a frame management unit (FMU) to capture, store, and redisplay multiple TV frames. These functions enable a controllable TV memory that makes watching TV more efficient, effective, and enjoyable, while providing a means of recovering key information.

Accordingly, a method is provided for frame capture and redisplay in a stand-alone television. The method comprises: down-converting a television signal including a plurality of frames; selecting an accepted frame; capturing the selected frame; storing the captured frame; selecting a stored frame; and, displaying the selected frame. In some aspects, the received television signal is displayed, simultaneously with the down-converting of the television signal.

Typically, storing the captured frame includes encoding the captured frame. Likewise, displaying the selected frame includes decoding the stored frame. Some aspects of the method further comprise: storing auxiliary information with the stored frame, such as time, date, or channel. Then, displaying the frame includes displaying the frame with the auxiliary information.

Other aspects of the method further comprise: accepting a remote capture and remote display signals from a television remote control. Down-converted frames are selected (captured) for storage, and stored frames are selected for display in response to the remote signals.

In some aspects, displaying the selected frame includes displaying stored frames as thumbnail displays. For example, a single thumbnail display, or a group of thumbnail displays can be presented overlying the down-converted television signal (the regular television program being watched by the viewer). In some aspects, the thumbnail displays are presented sequentially. Once selected, the thumbnail display can be presented as a full-resolution display.

Additional details of the above-described method and a stand-alone television system for the capture and redisplay of television frames are provided below.

DETAILED DESCRIPTION OF THE PREFERRED EMBODIMENTS

Figure 1:
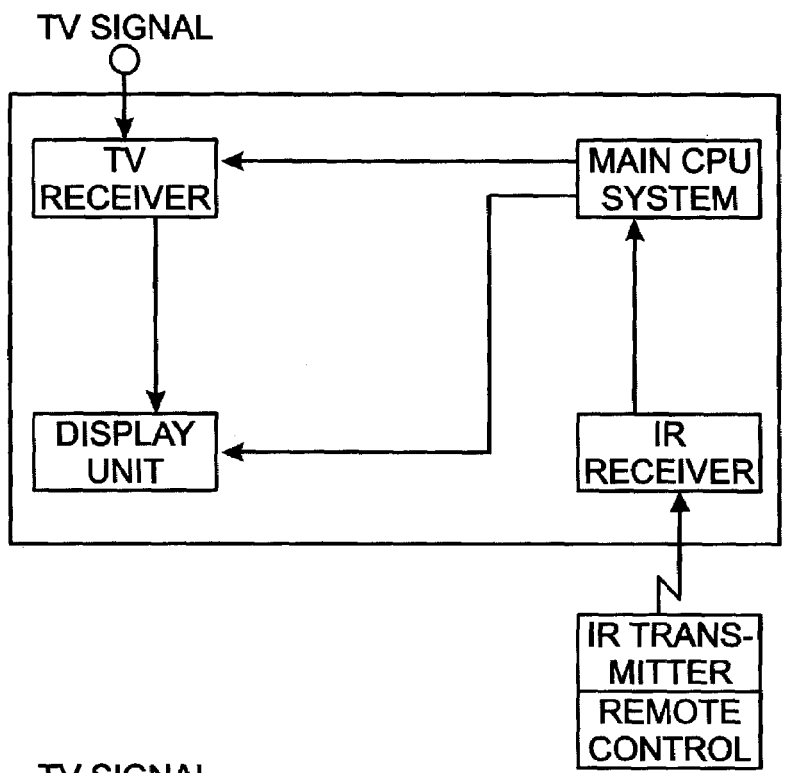
FIG. 1 is a schematic block diagram of a television (TV) receiving system (prior art).
Figure 2:
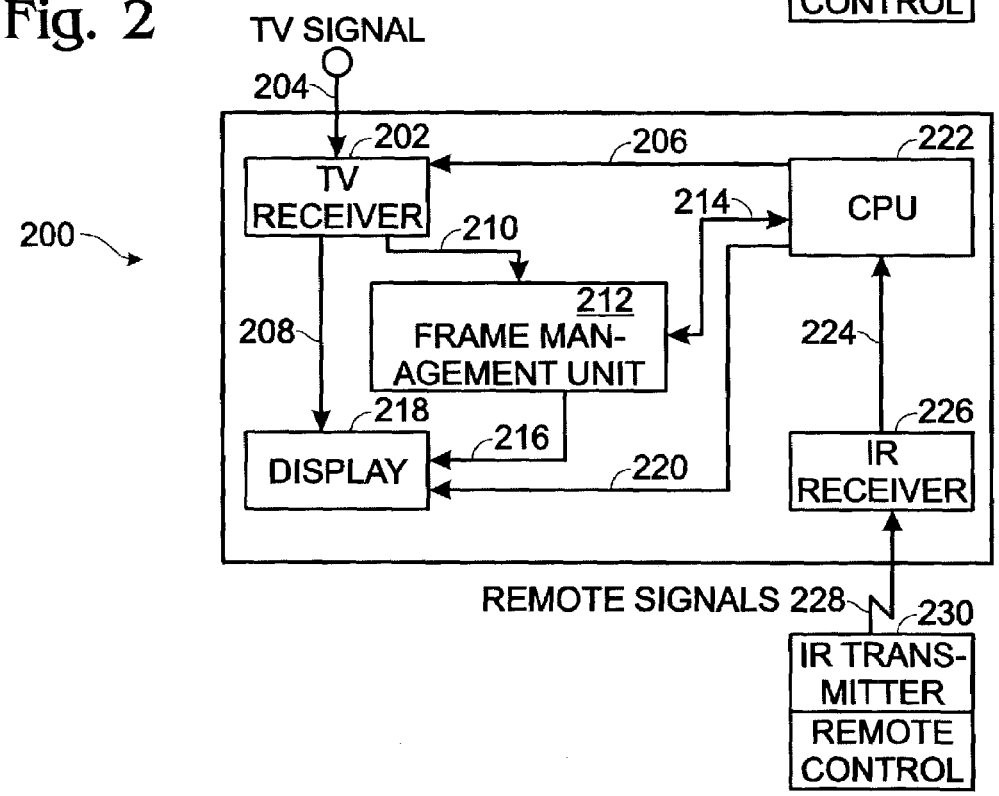
FIG. 2 is a schematic block diagram depicting the present invention stand-alone television system for frame capture and redisplay.

FIG. 2 is a schematic block diagram depicting the present invention stand-alone television system for frame capture and redisplay. The system 200 comprises a television (TV) receiver 202 having an input on line 204 to accept television signals and an input on line 206 to accept selection signals. The TV receiver 202 has an output on line 208 to supply down-converted television signals and an output on line 210 to supply frames from the television signal selected in response to the selection signals on line 206. As used herein, the word "frame" is understood to be the visual pixel information, and optionally the audio information, required to create a single TV screen presentation, or small number of associated TV screen presentations.

A frame management unit 212 (FMU) has an input on line 210 connected to the TV receiver output to accept captured frames and an input on line 214 to accept control signals. The FMU 212 stores captured frames and supplies selected frames from storage at an output on line 216 in response to the control signals on line 214. Typically, the FMU 212 accepts captured frames on line 210 and digitizes the frames prior to storage. In some aspects, digital television signals are down-converted by the receiver 202. Then, the FMU 212 stores the down-converted digital television frames that are captured. In other aspects, the FMU 212 converts the down-converted digital to a different digital format.

A display 218 has an input on line 220 to accept presentation signals and an input connected to the TV receiver output on line 208 to accept the down-converted television signals. The display 218 also has an input connected to the FMU output on line 216 to accept the stored frames. The display 216 presents the down-converted television signals and stored frames in response to the presentation signals on line 220.

A central processing unit (CPU) 222 has an input on line 224 to accept frame manipulation commands and an output connected to the TV receiver on line 206 to supply selection signals. The CPU 222 has an output connected to the FMU on line 214 to supply control signals and an output connected to the display on line 220 to supply presentation signals.

Figure 3:
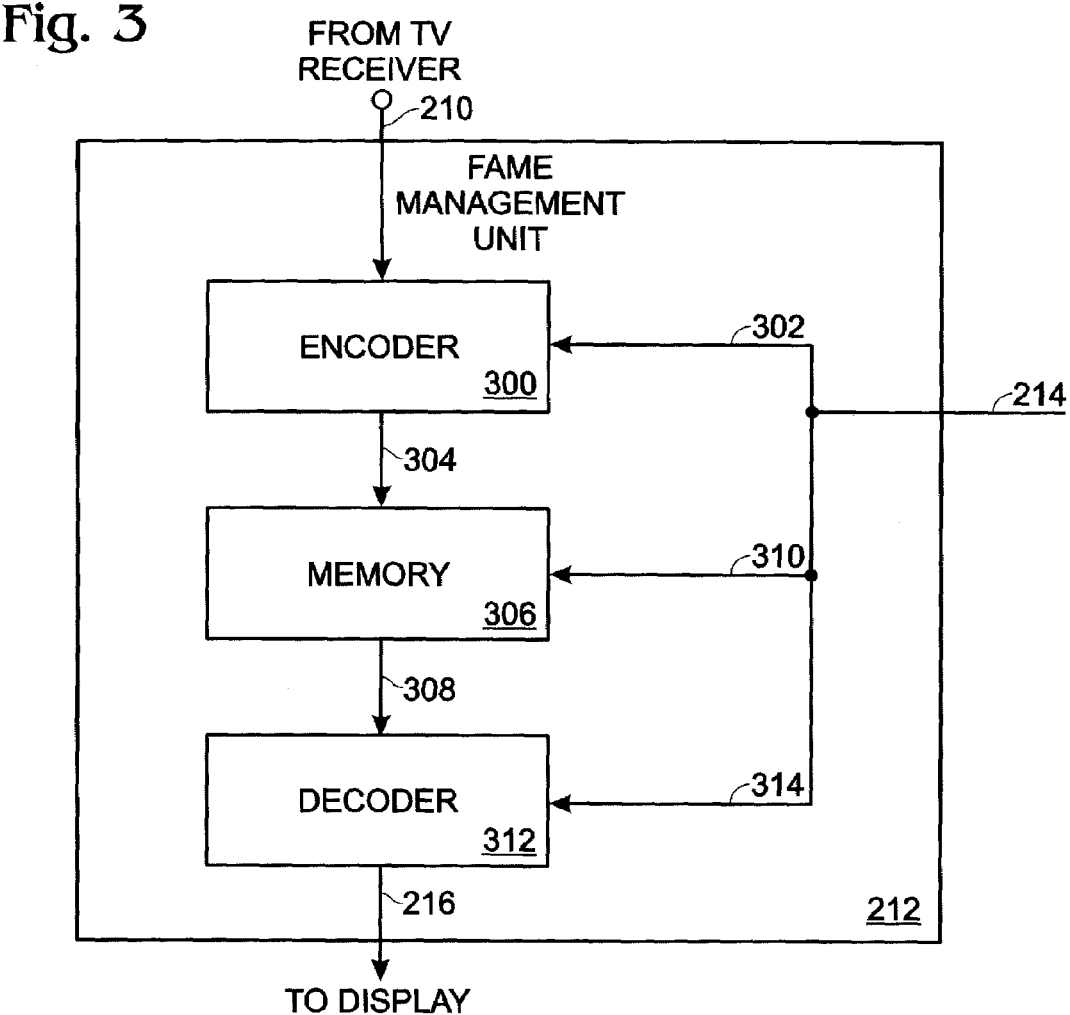
FIG. 3 is a schematic block diagram illustrating the FMU of FIG. 2 in greater detail.

FIG. 3 is a schematic block diagram illustrating the FMU 212 of FIG. 2 in greater detail. The FMU 212 includes an encoder 300 having an input on line 210 to accept captured frames from the TV receiver and input on line 302 to accept encoding control signals. The encoder 300 has an output on line 304 to supply encoded frames. A memory 306 has an input on line 304 to accept the encoded frames and an output on line 308 to supply stored frames. The memory 306 has an input to accept storage control signals on line 310. In some aspects, the FMU memory 306 is a removable storage medium. For example, the memory can be a floppy disk, writeable CD or DVD disk, or a memory chip such as might be used with a digital camera. Note that is other aspects of the invention, the removable storage medium can be used to import frames into the FMU 212.

A decoder 312 has an input on line 308 to accept stored frames from the memory 306 and an input on line 314 to accept decoding control signals. The decoder 312 has an output on line 216 to supply decoded frames to the display. As shown, the encoding, storage, and decoding control signals are associated with the control signal line 214 connected to the CPU. In other aspects of the system (not shown), some the CPU functions may be incorporated in the FMU 212. In other aspects, the CPU resides in the FMU 212.

In some aspects of the system, the encoder 300 accepts auxiliary information with the encoding control signals on line 302, and encodes the captured frames with auxiliary information such as the time, date, and/or channel to which the TV receiver is currently tuned. Then, the display presents the decoded frame with the auxiliary information. Alternately, the CPU may collect and cross-reference the auxiliary information with stored frames, and present the auxiliary information to either the decoder or display when necessary.

Returning to FIG. 2, some aspects of the system 200 further comprise an infrared (IR) receiver 226 having an input to accept remote capture signals, represented by reference designator 228, from remote control 230. The IR receiver 226 has an output connected to the CPU input on line 224 to supply frame manipulation capture commands. The CPU 222 sends selection signals to the TV receiver on line 206, and encoding and storage control signals on line 214 to the FMU 212 in response to receiving the frame manipulation capture commands on line 224. In other aspects of the system 200 (not shown), the receiver 226 and remote control 230 communicate using RF signals.

Likewise, the IR receiver 226 accepts remote display signals 228 and supplies frame manipulation display commands on line 224. The CPU 222 sends storage and decoding control signals to the FMU 212 on line 214, and presentation signals on line 220 to the display 218 in response to the frame manipulation display commands on line 224.

Considering both FIGS. 2 and 3, in some aspects of the system 200 the decoder 312 supplies down-sampled frames on line 216. The display 218 presents the down-sampled frames supplied from the decoder 218 as thumbnail displays in response to presentation signals on line 220. For example, the display 218 may present the thumbnail displays overlying the presentation of the down-converted television signal on line 208, in response to presentation signals on line 220. In other aspects, the display 218 presents a sequence of thumbnail displays in response to presentation signals. For example, the sequence may be presented as a slide show. Alternately, the sequence is advanced in response to remote signals 228.

In some aspects, the thumbnail displays can be selected for full-resolution display. The IR receiver 226 may accept remote display/play signals on line 228 to select a thumbnail display. For example, the third display in a sequence of thumbnail displays. The CPU 222 supplies decoding control signals on line 314 to the decoder 312 and presentation signals on line 220 to the display 218 in response to the remote display/play signals. The decoder 312 supplies a full-resolution frame in response to decoding control signals, and the display 218 presents a full-resolution display of the frame supplied by the decoder. Note that the viewer may also select a frame from storage by viewing the stored frames at full resolution.

In other aspects, the CPU 222 supplies decoding control signals on line 314 to the decoder 312 and presentation signals on line 220 to the display 218. The decoder 312 supplies a plurality of down-sampled frames to the display 218 in response to the decoding control signals, and the display 218 simultaneously presents a plurality of thumbnail displays in response to the presentation signals.

In this aspect, the thumbnail displays may also be selected for full-resolution display. The IR receiver 226 may accept remote display/play signals 228 to select a thumbnail display, from a group of thumbnail displays on the display screen. The selection method can be made using special programming of conventional keys, custom keys, or a highlight and enter selection process, to name but a few. The CPU 222 supplies decoding control signals on line 314 to the decoder 312 and presentation signals on line 220 to the display 218 in response to the remote display/play signals 228. The decoder 312 supplies a full-resolution frame in response to decoding control signals, and the display 218 presents a full-resolution display of the frame supplied by the decoder 312.

In other aspects of the system 200, the encoder 300 supplies encoded frames on line 304 to the memory 306 at a plurality of resolutions. That is, a single frame may be stored in more than one resolution, perhaps to save processing time associated with the decoding function. The decoder 312 may accept low-resolution frames from memory, and the display 218 may present thumbnail displays in response to the low-resolution frames supplied by the decoder 312. Thumbnail displays do not require a full-resolution frame. However, if the viewer selects a thumbnail display for full-resolution, the decoder 312 accepts a full-resolution frame from memory 306, and the display 218 presents full resolution displays in response to the full-resolution frames supplied by the decoder 312. Note that a frame may be stored in more than two (high and low) resolutions.

As an alternative to storing a frame in multiple resolutions, the encoder 300 may supply encoded frames on line 302 to the memory 306 encoded using a scalable protocol, such as Joint Photographic Experts Group 2000 (JPEG2000) protocol. The decoder 312 accepts frames from memory 306 and scales the frame in response to decoding commands on line 314. Typically, these encoding and decoding control signals are responsive to remote signals 228.

In some aspects of the system 200, the FMU memory 306 is able to write-protect, write-enable, and/or erase stored frames in response to storage control signals on line 310 from the CPU 222. Typically, these storage control signals are responsive to remote signals 228.

Functional Description

FIG. 2 shows an improved TV system with the present invention frame (capture and) management unit. The FMU is controlled by the CPU. The system takes the TV input from the TV receiver, and gives outputs to the display.

The encoder (FIG. 3) captures a video frame in response to receiving instruction from the CPU, or indirectly from a "Capture" button on the remote control. A video frame signal is digitized, temporally stored, and/or compressed by the picture encoder. The compressed picture is stored into the memory, which is managed by a Picture Management Unit (not shown), internal to the FMU, or by CPU. The decoder, when receiving instruction from the CPU, decodes the compressed video frames stored in the memory, and sends the result to the display.

The memory can be build-in TV set memory components, or a portable or removable memory. When portable memory is used, the viewer can download pictures from TV to view elsewhere, and can also upload pictures from the memory for viewing on TV screen.

The CPU manages the compressed pictures in the memory, keeps a picture index (including the capture date/time), and maintains efficient usage of the memory space. Pictures are erased from the memory if the CPU receives instruction from the viewer through the remote control. The memory can hold multiple frames. When the memory is full, the oldest frame can be erased, if a new picture is to be captured and stored.

The display supports non-conventional display modes in order to accommodate the frame management unit. The display can be: a regular TV viewing mode, Capture & Redisplay mode, or a combination of the two. A "viewing mode" button on the Remote Control can easily switch the mode from one to another.

In the Capture & Redisplay mode, the full TV screen can be used for displaying captured pictures. In the Combination mode, a partial screen is used for captured pictures, while the rest of the screen is used for the regular TV program.

In both of the non-conventional modes, a viewer can choose to navigate the picture index, typically viewing the thumbnails of stored pictures, using the remote control. Once the desired picture is chosen, the viewer can "play" the picture on screen. In the Capture & Redisplay mode, the "play" option results in full-resolution depiction of the selected thumbnail. In the Combination mode, a down-sampled or lower-resolution picture can be "played" simultaneously with the regular TV program. The viewer can also navigate through the pictures using the "play" option (full resolution) to a previous, or next picture. As another option, the viewer can choose an auto-slide-show mode to show the pictures one-by-one. The viewer can stop the slide show when a desired picture is reached. As another option, the viewer can display the capturing date/time on the screen while navigating.

For the thumbnail and down-sampled picture displays, a scalable picture coding technique is very desirable. For example, JPEG2000 is a very good candidate for picture coding, although other protocols known by those skilled in the art could also be used. With scalable image coding, the encoder need only encode the image once. Then, the decoder decodes the picture into the resolution needed. When non-scalable coding techniques are used, several versions of the same picture can be encoded at different resolutions, and stored to prevent the necessity of down-sampling when a lower-resolution picture is needed.

Figure 4:
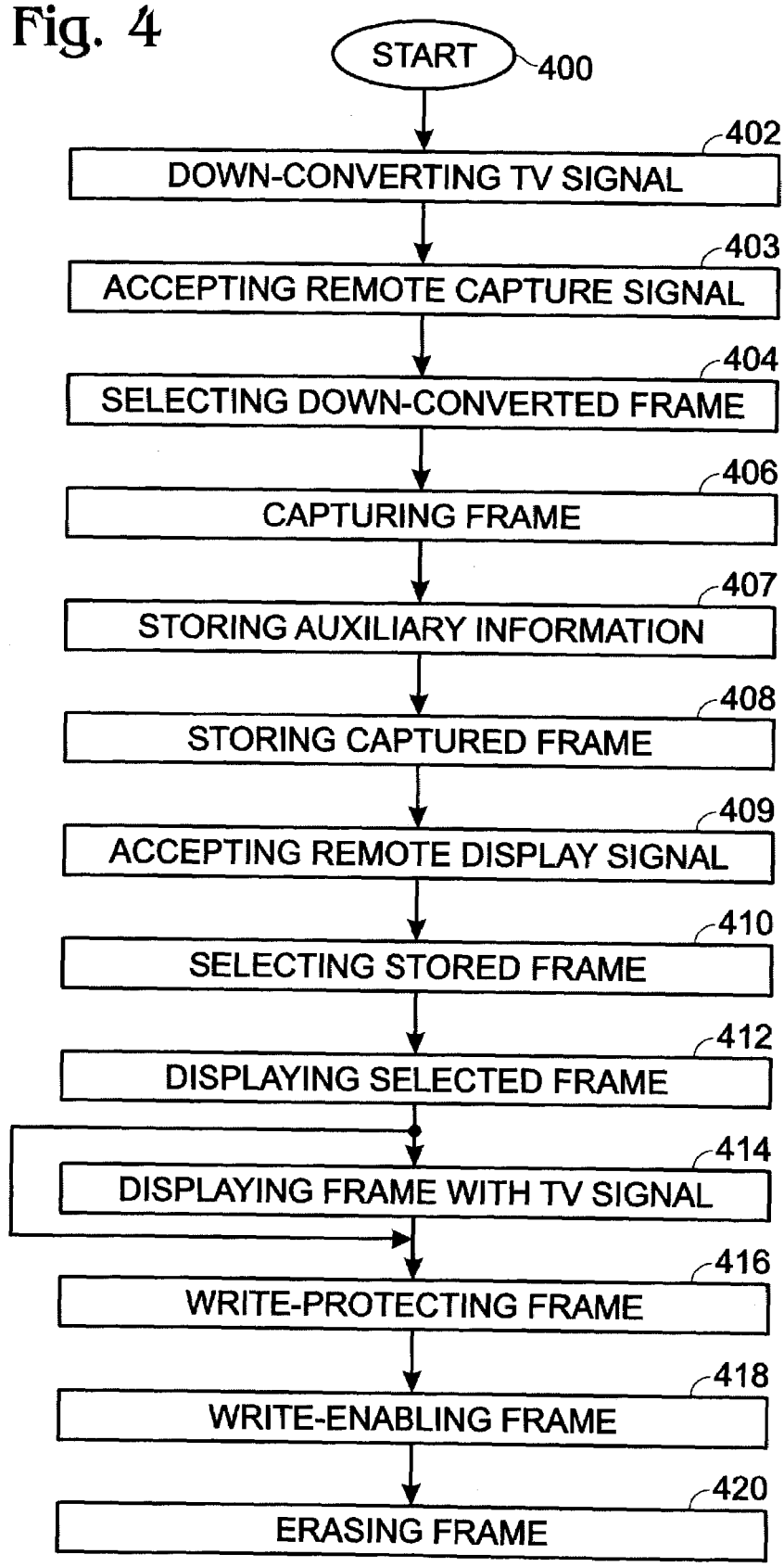
FIG. 4 is a flowchart illustrating the present invention method for frame capture and redisplay in a stand-alone television.

FIG. 4 is a flowchart illustrating the present invention method for frame capture and redisplay in a stand-alone television. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400.

Step 402 down-converts a television signal including a plurality of frames. Step 404 selects a down-converted frame. Step 406 captures the selected frame. Typically, the captured frame is digitized. Step 408 stores the captured frame. In some aspects, the captured frame is stored on a removable storage medium. Step 410 selects a stored frame. Step 412 displays the selected frame. In some aspects a further step (Step 414), simultaneously with the down-converting of the television signal (Step 402), displays the television signal.

In some aspects of the method, storing the captured frame in Step 408 includes encoding the captured frame. Then, displaying the selected frame in Step 412 includes decoding the stored frame.

Other aspects include a further step. Step 407 stores auxiliary information with the stored frame, such as the time, date, channel, or combinations of the above-mentioned information. Then, displaying the frame in Step 412 includes displaying the frame with the auxiliary information.

Some aspects of the method further comprise Step 403. Step 403 accepts a remote capture signal. Then, selecting a down-converted frame in Step 404 includes selecting a frame in response to the remote capture signal. Likewise, Step 409 accepts a remote display signal. Then, displaying the selected frame in Step 412 includes displaying a frame in response to the remote display signal.

In some aspects, displaying the selected frame in Step 412 includes displaying stored frames as thumbnail displays. For example, the thumbnail displays can be presented overlying the down-converted (regular) television signal. As an option, the thumbnail displays can be presented sequentially. As another option, a plurality of thumbnail displays can be simultaneously presented. Alternately, displaying the selected frame in Step 412 includes presenting a full resolution version of the selected thumbnail display.

In some aspects of the method, storing the captured frame in Step 408 includes storing the captured frame at a plurality of resolutions. Then, displaying stored frames as thumbnail displays in Step 412 includes using frames stored at a lower resolution for the thumbnail displays. Alternately, Step 412 displays the selected frame includes using frames stored at a full resolution. In other aspects, encoding the captured frame in Step 408 includes encoding the captured frame using a scalable coding technique, such as JPEG2000.

Some aspects of the method include further steps. Step 416 selects a stored frame to be write-protected. Step 418 selects the stored frame to be write-enabled. That is, the frame can be written over at the viewer's discretion. Step 420 erases the write-enabled frame. As noted above, in other aspects, older frames are automatically overwritten when the memory becomes too full.

A system and method of capturing, storing, and redisplaying frames in a stand-alone television have been presented. Some examples have been given of the storage, capture, and display functions. However, the invention is not limited to merely these examples. Other variations and embodiments of the invention will occur to those skilled in the art.

The invention claimed is:

1. In a stand-alone television, a method for frame capture and redisplay, the method comprising:
    down-converting a television signal including a plurality of frames;
    selecting a down-converted frame;
    capturing the selected frame;
    storing the captured frame;
    selecting a stored frame; and,
    displaying the selected frame.

2. The method of claim 1 further comprising:
    simultaneously with the down-converting of the television signal, displaying the television signal.

3. The method of claim 1 wherein capturing the selected frame includes digitizing the captured frame.

4. The method of claim 3 wherein storing the captured frame includes encoding the captured frame; and,
    wherein displaying the selected frame includes decoding the stored frame.

5. The method of claim 1 wherein storing the captured frame includes storing the captured frame on a removable storage medium.

6. The method of claim 1 further comprising:
    storing auxiliary information with the stored frame selected from the group including time, date, and channel; and,
    wherein the displaying the frame includes displaying the frame with the auxiliary information.

7. The method of claim 1 further comprising:
    accepting a remote capture signal; and,
    wherein selecting a down-converted frame includes selecting a frame in response to the remote capture signal.

8. The method of claim 1 further comprising;
    accepting a remote display signal; and,
    wherein displaying the selected frame includes displaying a frame in response to the remote display signal.

9. The method of claim 1 wherein displaying the selected frame includes displaying stored frames as thumbnail displays.

10. The method of claim 9 wherein displaying stored frames as thumbnail displays includes presenting the thumbnail displays overlying the presentation of the down-converted television signal.

11. The method of claim 9 wherein displaying stored frames as thumbnail displays includes sequentially presenting the thumbnail displays.

12. The method of claim 11 wherein displaying the selected frame includes presenting a full resolution version of the selected thumbnail display.

13. The method of claim 9 wherein displaying stored frames as thumbnail displays includes simultaneously presenting a plurality thumbnail displays.

14. The method of claim 13 wherein displaying the selected frame includes presenting a full resolution version of the selected thumbnail display.

15. The method of claim 9 wherein storing the captured frame includes storing the captured frame at a plurality of resolutions; and,
    wherein displaying stored frames as thumbnail displays includes using frames stored at a lower resolution for the thumbnail displays.

16. The method of claim 15 wherein displaying the selected frame includes using frames stored at a full resolution.

17. The method of claim 4 wherein encoding the captured frame includes encoding the captured frame using a scalable coding technique.

18. The method of claim 17 wherein encoding the captured frame using a scalable coding technique includes encoding the frame using a Joint Photographic Experts Group 2000 (JPEG2000) protocol.

19. The method of claim 1 further comprising:
    selecting a stored frame to be write-protected;
    selecting the stored frame to be write-enabled; and,
    erasing the write-enabled frame.

20. A stand-alone television system for frame capture and redisplay, the system comprising:
    a television (TV) receiver having an input to accept television signals and an input to accept selection signals, the TV receiver having an output to supply down-converted television signals and an output to supply a frame from the television signal selected in response to the selection signals;
    a frame management unit (FMU) having an input connected to the TV receiver output to accept the captured frame and an input to accept control signals, the FMU storing thin captured frame and supplying the selected frame from storage at an output in response to the control signals;
    a display having an input to accept presentation signals, an input connected to the TV receiver output to accept the down-converted television signals, and an input connected to the FMU output to accept the stored frame, the display presenting the down-converted television signals and stored frame in response to the presentation signals; and,
    a central processing unit (CPU) having an input to accept frame manipulation commands, an output connected to the TV receiver to supply selection signals, an output connected to the FMU to supply control signals, and an output connected to the display to supply presentation signals.

21. The system of claim 20 wherein the FMU accepts captured frames and digitizes the frames prior to storage.

22. The system of claim 21 wherein the FMU includes:
an encoder having an input to accept captured frames from the TV receiver, and input to accept encoding control signals, and an output to supply encoded frames;
a memory having an input to accept the encoded frames, an output to supply stored frames, and an input to accept storage control signals; and,
a decoder having an input to accept stored frames from the memory, an input to accept decoding control signals, and an output to supply decoded frames to the display.

23. The system of claim 22 wherein the FMU memory is a removable storage medium.

24. The system of claim 22 wherein the encoder accepts auxiliary information with the encoding control signals and encodes the captured frames with auxiliary information selected from the group including time, date, and channel; and,
wherein the display presents the decoded frame with the auxiliary information.

25. The system of claim 22 further comprising:
an infrared (IR) receiver having an input to accept remote capture signals and an output connected to the CPU input to supply frame manipulation capture commands; and,
wherein the CPU sends selection signals to the TV receiver, and encoding and storage control signals to the FMU in response to receiving the frame manipulation capture commands.

26. The system of claim 25 wherein the IR receiver accepts remote display signals and supplies frame manipulation display commands; and,
wherein the CPU sends storage and decoding control signals to the FMU, and presentation signals to the display in response to the frame manipulation display commands.

27. The system of claim 26 wherein the decoder supplies down-sampled frames; and,
wherein the display presents the down-sampled frames supplied from the decoder as thumbnail displays in response to presentation signals.

28. The system of claim 27 wherein the display presents the thumbnail displays overlying the presentation of the down-converted television signal in response to presentation signals.

29. The system of claim 27 wherein the display presents a sequence of thumbnail displays in response to presentation signals.

30. The system of claim 29 wherein the IR receiver accepts remote display/play signals to select a thumbnail display;
wherein the CPU supplies decoding control signals to the decoder and presentation signals to the display in response to the remote display/play signals;
wherein the decoder supplies a full-resolution frame in response to decoding control signals; and,
wherein the display presents a full-resolution display of the frame supplied by the decoder.

31. The system of claim 27 wherein the CPU supplies decoding control signals to the decoder and presentation signals to the display;
wherein the decoder supplies a plurality of down-sampled frames to the display in response to the decoding control signals; and,
wherein the display simultaneously presents a plurality of thumbnail displays in response to the presentation signals.

32. The system of claim 31 wherein the IR receiver accepts remote display/play signals to select a thumbnail display;
wherein the CPU supplies decoding control signals to the decoder and presentation signals to the display in response to the remote display/play signals;
wherein the decoder supplies a full-resolution frame in response to decoding control signals; and,
wherein the display presents a full-resolution display of the frame supplied by the decoder.

33. The system of claim 27 wherein the encoder supplies encoded frames to the memory at a plurality of resolutions;
wherein the decoder accepts low-resolution frames from memory; and,
wherein the display presents thumbnail displays in response to the low-resolution frames supplied by the decoder.

34. The system of claim 33 wherein the decoder accepts a full-resolution frame from memory; and,
wherein the display presents full resolution displays in response to the full-resolution frames supplied by the decoder.

35. The system of claim 27 wherein the encoder supplies encoded frames to the memory encoded using a scalable protocol; and,
wherein the decoder accepts frames from memory and scales the frame in response to decoding commands.

36. The system of claim 35 wherein the encoder and decoder use a Joint Photographic Experts Group 2000 (JPEG2000) protocol.

37. The system of claim 22 further the FMU memory write-protects, write-enables, and erases stored frames in response to storage control signals from the CPU.

38. In a stand-alone television, a method for frame capture and redisplay, the method comprising:
down-converting a television signal including a plurality of frames;
selecting a down-converted frame;
capturing the selected frame;
storing the captured frame at a plurality of resolutions;
selecting a stored frame; and,
displaying the selected frame as a lower resolution thumbnail display.

* * * * *